United States Patent [19]

Seymour

[11] 4,153,188

[45] May 8, 1979

[54] TIRE HOLD-DOWN DEVICE

[76] Inventor: Claude W. Seymour, 8401 Delido Rd., Louisville, Ky. 40219

[21] Appl. No.: 759,997

[22] Filed: Feb. 28, 1977

[51] Int. Cl.$^2$ ............................................. B62D 43/10
[52] U.S. Cl. ............................... 224/42.24; 224/42.25
[58] Field of Search ................. 224/42.12, 42.19, 42.2, 224/42.24, 42.25, 42.26; 248/500, 503; 280/179 R; 296/37.2; 70/259, 260

[56] References Cited

U.S. PATENT DOCUMENTS

| 2,304,515 | 12/1942 | Turnbull | 70/259 X |
|---|---|---|---|
| 3,081,924 | 3/1963 | Merbler | 224/42.24 |
| 3,806,204 | 4/1974 | Sutton | 303/20 X |
| 3,823,858 | 7/1974 | Schnakenberg | 224/42.24 |
| 3,843,033 | 10/1974 | Wirth | 224/42.24 |
| 4,013,203 | 3/1977 | McCauley | 224/42.24 |
| 4,068,856 | 1/1978 | Harris | 224/42.24 |

*Primary Examiner*—Trygve M. Blix
*Assistant Examiner*—Winston H. Douglas
*Attorney, Agent, or Firm*—Edward M. Steutermann

[57] ABSTRACT

A hold-down arrangement to secure an automotive wheel, for example a spare tire, to a fixed support including a plate having an aperture therein and adapted to engage a portion of the wheel to be secured, a cooperative eye secured to the support to which the wheel is to be secured, an elongate post having an opening spaced longitudinally along a portion of the post adjacent a first end thereof, a bracket extending laterally from a second end of the post, a cooperative cam including operator, where the cam including a cooperative detent adapted to engage the opening of the post extending from the cam to be received in the opening of the post whereby the detent of the cam is inserted in the opening of the post so the said cam can be rotated to engage the plate to urge the plate against the wheel to be secured.

2 Claims, 2 Drawing Figures

TIRE HOLD-DOWN DEVICE

BACKGROUND OF THE INVENTION

Various prior art arrangements have been developed to secure a wheel assembly, for example a spare tire, in a storage position of an automotive vehicle, for example to secure the spare tire in a trunk of an automobile. Such prior arrangements have generally been cumbersome and difficult to manipulate, particularly when the spare tire is located in a difficulty accessible location in the trunk.

In some instances more efficient tire or wheel retaining means have been provided but such arrangements have generally been prohibitively expensive.

In practice, in the automobile trade, it has been common to provide a luggage compartment in the rear portion of the vehicle body. The luggage compartment is usually arranged to have a spare tire and wheel carried on the floor thereof, where a loop or hook is provided and adapted to receive a j-bolt secured to the automobile frame. In such arrangements the location of the spare tire within the luggage compartment is determined by the configuration and location of the essential elements of the automotive vehicle. In some cases, it is necessary as a result of design considerations, to locate the spare tire storage facility in relatively inaccessible locations.

In general, the predominant arrangement for securing a spare tire in an automobile includes means where the j-bolt is adapted to be received in an eye located in the floor of the trunk of the automotive vehicle where the upstanding of the end of the j-bolt is threaded. The hook of the j-bolt is received in the eye and a butterfly nut is provided to engage the threaded portion of the j-bolt to secure the wheel in the automobile. Such devices require the use of both hands to secure the automobile tire within the trunk and in some instances require the vehicle operator to climb into the trunk to secure or release the tire.

Another prior art arrangement is shown in U.S. Pat. No. 3,807,204, Cucharan, which teaches a bar having a hook at one end where an opposite end of the hook is threaded to receive a lock mechanism.

Additionally, U.S. Pat. No. 2,217,775, Smith, teaches an arrangement which includes a cam wheel having cam slots to extend and retract arms to secure a wheel in a given position where a central lock is provided to lock the arms in the extended position to retain the tire. Devices taught by the Smith reference are extremely complex to fabricate, expensive, and entail some difficulty in alignment for operation.

Other alternative arrangements, not within the scope of the present invention, have been provided to accomplish the purposes of the present invention but none has produced a device with satisfactory operability at the relative inexpensive cost incurred in producing devices in accordance with the present invention.

SUMMARY OF THE INVENTION

The present invention provides inexpensive, straightforward, arrangements to secure wheels, for example spare tires in an automotive vehicle, for example in the trunk of the automobile in either a vertical or horizontal position, which can be easily operated to secure and release the spare tire wheel.

In general, the present invention provides a device including an arm which can be adapted to be received through the central aperture in the wheel, and is further adapted to receive a base plate to be urged against the wheel to hold the wheel in a selected position with a cam device provided on the arm and rotated to a position to urge the plate against the wheel.

Devices provided by the present invention can further be easily adapted to provide means to lock the tire in secured position within the automobile to prevent theft of the tire.

Moreover, devices in accordance with the present invention can be provided to simultaneously secure and lock the wheel in place within the vehicle to prevent, or at least discourage, theft of the wheel.

Devices in accordance with the present invention can further, advantageously, be fabricated from relatively inexpensive piece parts and can be easily adaptable to secure wheels of varied configuration and dimension.

Moreover, devices in accordance with the present invention can easily be substituted for the j-bolt assembly normally provided in new automobiles and at a relatively inexpensive price.

The present invention provides a hold-down arrangement to secure an automotive wheel, for example a spare tire, to a fixed support including plate means adapted to engage a portion of the wheel to be secured and having a cooperative aperture therein, cooperative eye means secured to the support to which the wheel is to be secured, elongate post means adapted to be received through the plate aperture means and having opening means spaced longitudinally along a portion of the post means adjacent a first end thereof, bracket means extending laterally from a second end of the post means to be received in the eye means, cooperative cam means including cam operator means, cam means, cooperative detent means adapted to engage the opening means of the post means extending from the cam means to be received in the opening means of the post means whereby the detent means of the cam means is inserted in the opening means of the post means so the cam means can be rotated by the cam operator means to engage the plate means to urge the plate means against the wheel to be secured.

Various other features of the present invention will become obvious to those skilled in the art upon reading the disclosure set forth hereinafter.

Figure 1:
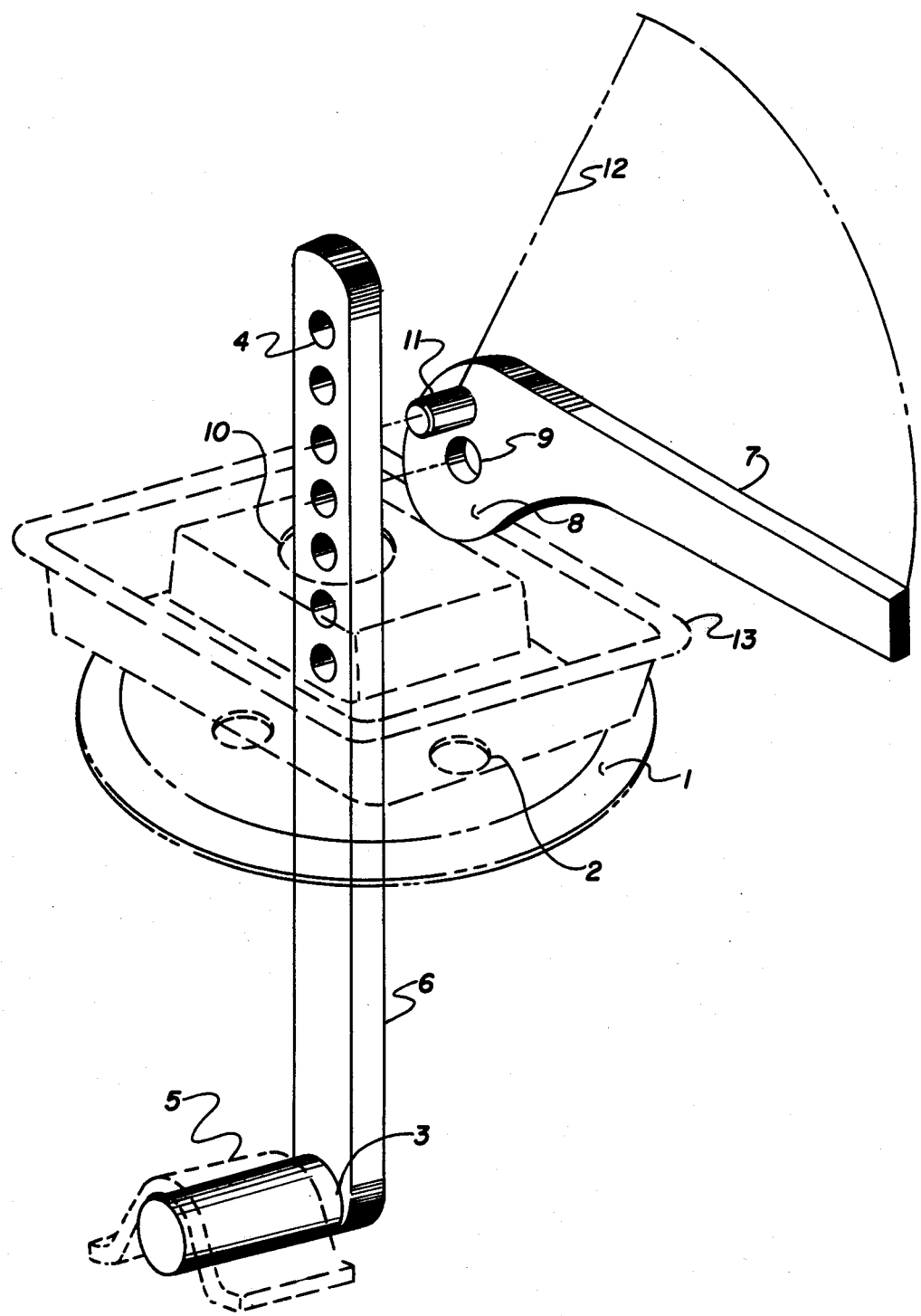
FIG. 1 is a view, in perspective, and partially in shadow line, of one arrangement in accordance with the present invention.

Referring now to the arrangement shown in FIG. 1, the device is adapted to be connected through an eye 5, for example carried by the frame of an automobile. A post 6 is provided having a laterally extending arm 3 to be received within eye 5, as shown, and apertures 4 are shown spaced along the upper end of post 6 and generally along the longitudinal axis of post 6. Post 6 extends through a cooperative opening in a wheel 1 (where only the central portion of the wheel is shown, and will be understood that the wheel can be adapted to carry a tire).

A plate 13, for example the base plate of a jack, as is commonly known, is used to secure the wheel and includes an aperture 10 to receive post 6. The arrangement is such that base plate 13 rests on the surface of wheel 1.

Within the scope of the present invention, a cam member, which can include an arm 7 having a cam surface 8 extending outwardly from the cam surface is provided to be utilized as described hereinafter. Cam arm 7 further includes a laterally extending post 11, adapted to be received in apertures 4 of post 6.

Cam arm 7 can also include a cooperative aperature 9 of approximately the same diameter as apertures 4 of post 6.

In operation, wheel 1 is placed in position to be secured, post 6 is inserted through a cooperative central aperture (not shown) of wheel 1 and plate 13 is placed on wheel 1 with post 6 extending through aperture 10. Post 11 is inserted through a selected aperture 4 of post 6 with handle 7 at a given angle, for example illustrated by broken lines 12, such that cam arm 7 can be rotated downwardly to the position shown in full line to urge cam surface 8 into tight engagement with base 13 so that base 13 is urged against wheel 1. The position of post 11, in apertures 4, is such that when handle 7 is fully drawn down, aperture 9 of cam arm 7 is in alignment with a selected aperture 4 of post 4 so that a locking device, for example a padlock, can be inserted through both aperture 9 and the selected aperture 4 of post 6 to lock cam arm 7 in position and to secure wheel 1 to post 6.

Figure 2:
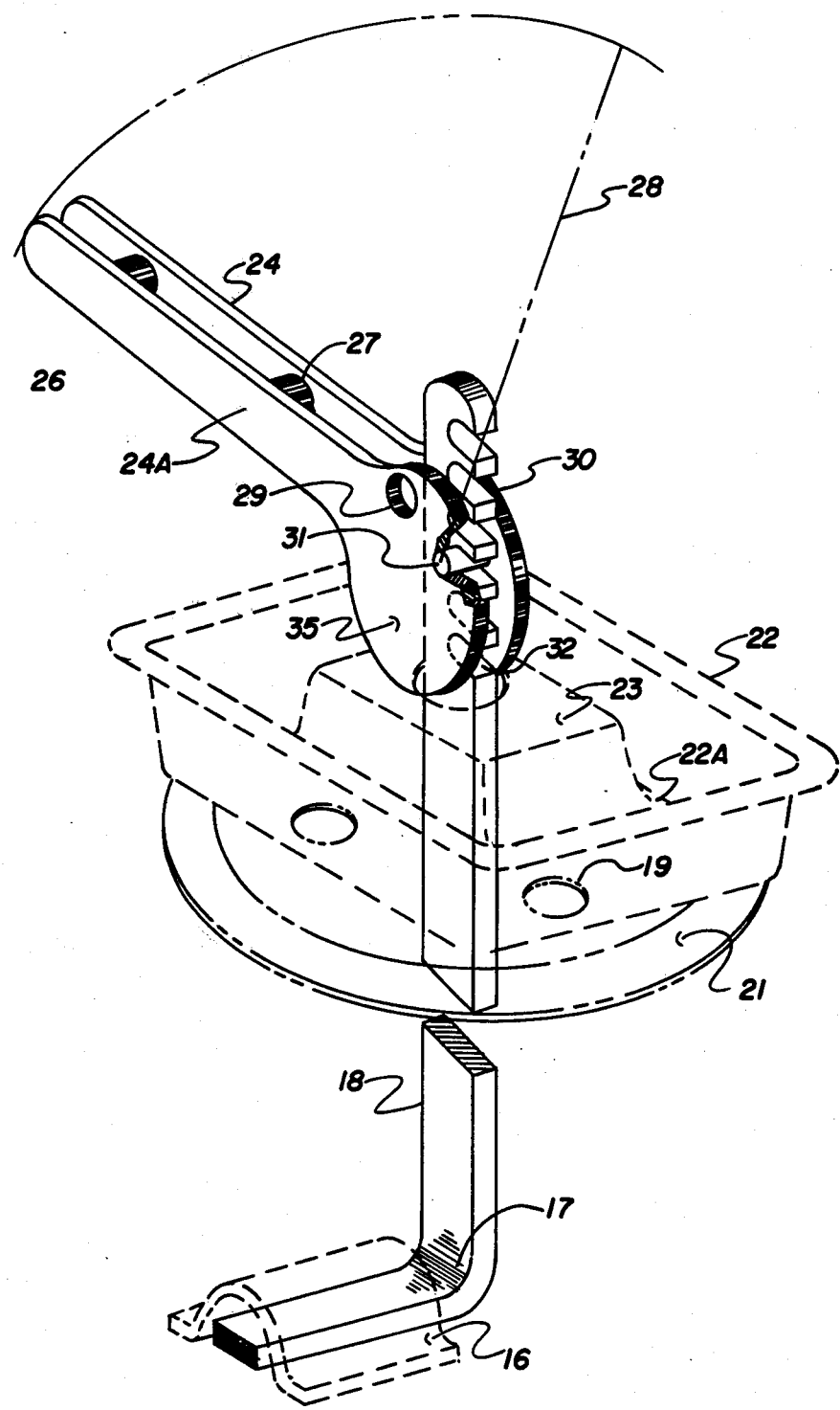
FIG. 2 is a view, in perspective, and partially in shadow line, showing another arrangement in accordance with the present invention.

Referring now to FIG. 2, an alternative arrangement is shown within the scope of the present invention to secure a wheel 21 to a selected surface wherein an eye 16 is provided and secured to the surface to which a wheel is to be fastened. Wheel 21 can have a cooperative central aperture (not shown) to receive a post 18, described hereinafter. Eye 16 can be secured to the frame of an automobile.

Post means 18, having a laterally extending arm section 17 is provided so that arm section 17 is received within the opening provided by eye 16. Post 18 then extends upwardly through the central opening of wheel 21 and includes a series of slots 30 as shown, a portion of which are located above wheel 21.

A cooperative plate member 22, for example a jack base can be adapted to be placed on top of wheel 21 and has a central aperture 32 which can be placed in aligned relation with the central aperture of wheel 21, as hereinafter described. Base 22 also can be provided with a cam engaging surface 25 as hereinafter described.

A cam member 26 can be provided which can include spaced arm members 24, 24A separated by spacers 27 where spacers 27 have a length approximately the same as its width of post 18 to selectively provide a space between arm members 24, 24A so that post 18 can be received between arm members 24, 24A. A cooperating cam surface 35 can be provided and adapted to engage plate member 22, by inserting post 18 through space 32 formed between the ends of arms 24, 24A, and rotating handle 26 as described hereinafter. Additionally, a post member 31 is secured to both arm members 24, 24A and extends across the opening 32 provided between the arm members 24, 24A as shown. Post member 31 is cooperatively sized to be received in slots 30 as shown.

In operation, wheel 1 and base member 22 are positioned as shown and cam arm 26 is inserted in a selected aperture 30 of post 18. Cam arm 26 is then rotated through an angle between broken line 28 to the position shown in full line so that cam surface 35 is urged into tighter and tighter relation with a surface 23 provided in base plate 22 until aperture 29 clears the edge of post 18, as shown, at which time a lock, for example a padlock, is inserted through aperture 29 so that the portion of the lock inserted through the aperture engages the edge of post 18 to prevent removal of cam arm 26 without first removing the lock means.

It will be understood that the foregoing are but two examples of embodiment within the scope of the present invention and that the scope provided by the present invention as set out in the claims appended hereinafter.

The invention claimed is:

1. A hold-down arrangement to secure an automotive wheel to a fixed support including:
   a. plate means having cooperative aperture therein and adapted to engage a portion of said wheel;
   b. cooperative eye means carried by said support;
   c. elongate post means having at least two transverse opening means provided in said post means and wherein said opening means are located in spaced relation along a portion of the length of said post adjacent a first end of the post means where said post means is adapted to be received through said aperture means of said plate means;
   d. bracket means extending laterally from a second end of said post means to be releasably received by said eye means;
   e. cooperative cam means carried by cooperative handle means with detent means extending laterally from said cam means and cooperatively secured to said cam means where said detent means is adapted to be received in selected opening means of said post means to provide pivot means about which said cam means can be pivoted and rotated to engage said plate means to urge said plate means against said wheel to secure wheel to fixed position relative to said support.
   f. said cam means being provided with a cooperative aperture means located so that when said cam means is pivoted and rotated to urge said plate means against said wheel to secure said wheel to a fixed position relative to said support, said cooperative aperture means is aligned with a transverse opening means of the post means.

2. The invention of claim 1 wherein said transverse opening means are slot means extending from the periphery of said post means where said slot means intersects said periphery of said post means to define a peripheral opening to said opening means and transversely across a portion thereof so said detent means can be received into said opening means through said peripheral openings.

* * * * *